(12) United States Patent
Ido

(10) Patent No.: US 11,755,269 B2
(45) Date of Patent: Sep. 12, 2023

(54) IMAGE PROCESSING APPARATUS AND CONTROL METHOD FOR DISPLAY BASED ON ADDRESS BOOK DATA

(71) Applicant: SHARP KABUSHIKI KAISHA, Osaka (JP)

(72) Inventor: Kazuhiko Ido, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 17/718,161

(22) Filed: Apr. 11, 2022

(65) Prior Publication Data

US 2022/0350554 A1 Nov. 3, 2022

(30) Foreign Application Priority Data

Apr. 28, 2021 (JP) ................. 2021-076251

(51) Int. Cl.
*G06F 3/12* (2006.01)
(52) U.S. Cl.
CPC .......... *G06F 3/1273* (2013.01); *G06F 3/1207* (2013.01); *G06F 3/1256* (2013.01); *G06F 3/1292* (2013.01)
(58) Field of Classification Search
None
See application file for complete search history.

(56) References Cited

U.S. PATENT DOCUMENTS

| 2007/0043816 | A1* | 2/2007 | Ishibashi | G06Q 10/107 |
| | | | | 709/206 |
| 2008/0195663 | A1* | 8/2008 | Sekine | G03G 15/502 |
| 2017/0171414 | A1* | 6/2017 | Naito | H04N 1/32106 |
| 2019/0098166 | A1* | 3/2019 | Sugita | H04N 1/00413 |
| 2019/0379796 | A1* | 12/2019 | Sugita | H04N 1/00225 |
| 2020/0293620 | A1* | 9/2020 | Sato | H04M 1/27467 |
| 2020/0322502 | A1* | 10/2020 | Tajima | H04N 1/32058 |

FOREIGN PATENT DOCUMENTS

JP 2019-062349 A 4/2019

* cited by examiner

*Primary Examiner* — Henok Shiferaw
(74) *Attorney, Agent, or Firm* — ScienBiziP, P.C.

(57) ABSTRACT

An image processing apparatus includes: a receiver that communicates with a terminal device, and receives, from the terminal device, destination information including group information; a selector that selects, in a case where a selected group history indicating that the group information is selected in the past is stored in a storage, one piece of group information from among the group information included in the destination information, based on the selected group history; and a screen displayer that performs control of displaying, on a displayer, destination information including the one piece of group information selected by the selector.

7 Claims, 20 Drawing Sheets

FIG. 3

| NAME | PHONE NUMBER | E-MAIL ADDRESS | GROUP NAME |
|---|---|---|---|
| BUSINESS PARTNER 1 | 03-1111-2222 | info@a-sha.com | BUSINESS PARTNER |
| BUSINESS PARTNER 2 | 03-1234-5678 | eigyo@b-sha.com | BUSINESS PARTNER |
| BUSINESS PARTNER 3 | 06-1111-2222 | info@c-sha.com | BUSINESS PARTNER |
| BUSINESS PARTNER 4 | 03-1111-3333 | inquiry@d-sha.com | BUSINESS PARTNER |
| ⋮ | ⋮ | ⋮ | ⋮ |
| AI○○ | 070-0222-3333 | ai@example.com | EMPLOYEE |
| AOI△△ | 080-0111-2222 | aoi@example.com | EMPLOYEE |
| ⋮ | ⋮ | ⋮ | ⋮ |

FIG. 5

| NAME | FACSIMILE NUMBER | E-MAIL ADDRESS |
|---|---|---|
| TAKAGI○○ | 03-0987-6543 | takagi@example.com |
| TAKASAKI○○ | - | takasaki@example.com |
| TAKADA○○ | - | takada@example.com |
| ⋮ | ⋮ | ⋮ |

FIG. 6

| TERMINAL DEVICE ID | GROUP NAME |
|---|---|
| 35-123456-789012-3 | BUSINESS PARTNER |
| 11-222222-333333-4 | EMPLOYEE |
| ⋮ | ⋮ |

FIG. 7

| TERMINAL DEVICE ID | DESTINATION | TRANSMISSION DATE AND TIME |
|---|---|---|
| 35-123456-789012-3 | eigyo@b-sha.com | JANUARY 15, 2021 19:02:21 |
| 35-123456-789012-3 | info@a-sha.com | JANUARY 16, 2021 09:12:25 |
| - | takada@example.com | JANUARY 16, 2021 10:22:55 |
| ⋮ | ⋮ | ⋮ |

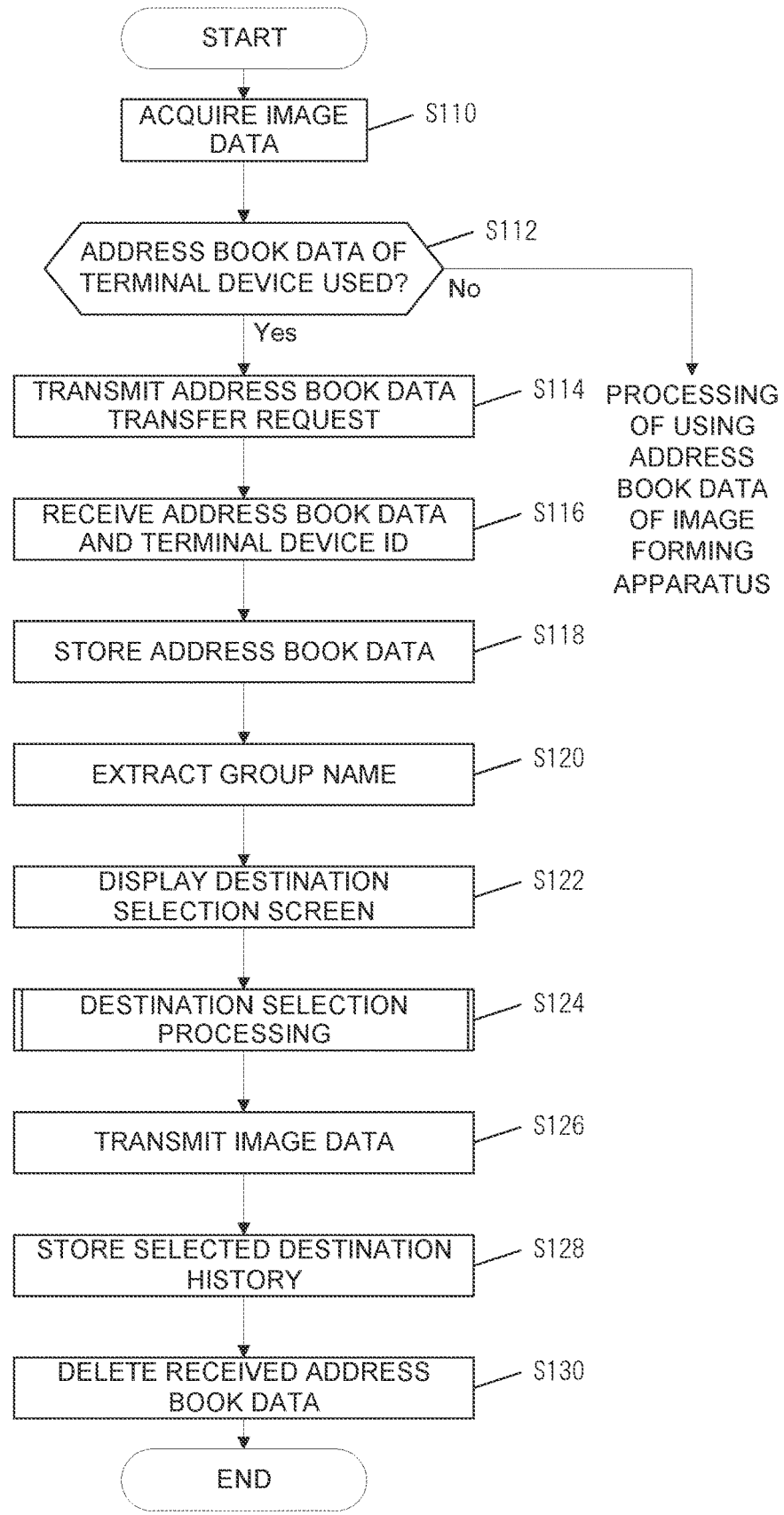

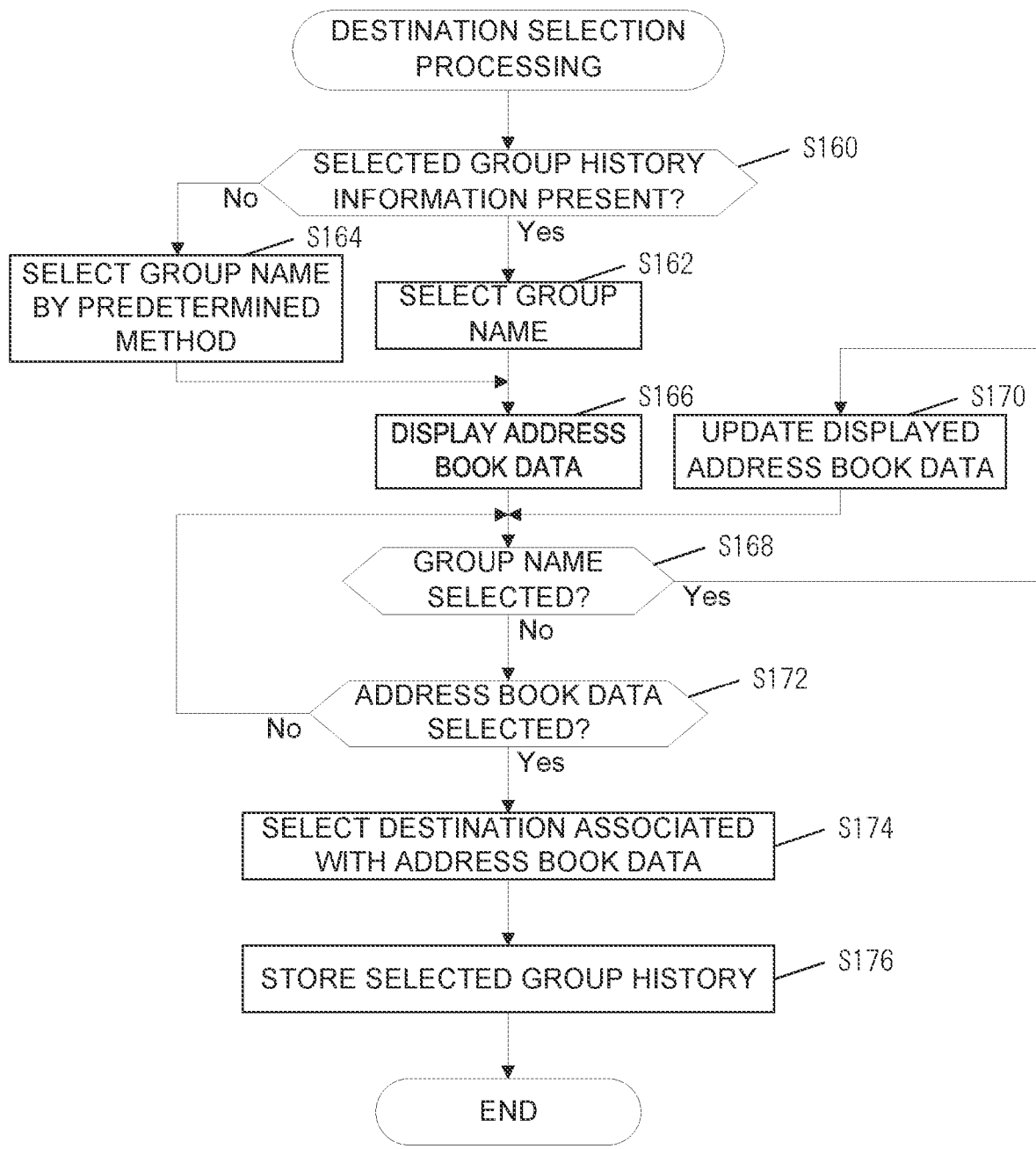

FIG. 14

| NAME | PHONE NUMBER | E-MAIL ADDRESS | GROUP NAME |
|---|---|---|---|
| BUSINESS PARTNER 1 | 03-1111-2222 | info@a-sha.com | BUSINESS PARTNER, PRODUCT A |
| BUSINESS PARTNER 2 | 03-1234-5678 | eigyo@b-sha.com | BUSINESS PARTNER, PRODUCT B |
| BUSINESS PARTNER 3 | 06-1111-2222 | info@c-sha.com | BUSINESS PARTNER, PRODUCT A |
| BUSINESS PARTNER 4 | 03-1111-3333 | inquiry@d-sha.com | BUSINESS PARTNER, PRODUCT C |
| ⋮ | ⋮ | ⋮ | ⋮ |
| AI○○ | 070-0222-3333 | ai@example.com | EMPLOYEE, SALES DEPARTMENT |
| AOI△△ | 080-0111-2222 | aoi@example.com | EMPLOYEE, HUMAN RESOURCES DEPARTMENT |
| ⋮ | ⋮ | ⋮ | ⋮ |

IMAGE PROCESSING APPARATUS AND CONTROL METHOD FOR DISPLAY BASED ON ADDRESS BOOK DATA

BACKGROUND OF THE INVENTION

Field of the Invention

The present disclosure relates to an image processing apparatus and the like.

Description of the Background Art

Conventionally, digital multifunction machines (MFP: MultiFunction Peripheral/Printer) having a copy function, a print function, a scanner function, a mail transmission function, and the like have been widely used. Further, some multifunction machines also have a function of transmitting, to a destination designated by a user, an image of a document read by a scanner function.

Further, a technique for acquiring destination information from another device has also been proposed. For example, an image processing apparatus has been proposed in which destination information is acquired from a mobile terminal, an image processing function to be performed is switched based on the acquired destination information, and settings of the image processing function are performed (see, for example, Japanese Unexamined Patent Application Publication No. 2019-062349).

When destination information is transferred (transmitted) to an image processing apparatus, destination information stored in a device (e.g., a terminal device) to be operated by a user may be collectively transmitted. In addition, after executing a job of transmitting an image, the image processing apparatus may delete destination information acquired from another device. This is because it is not appropriate to continue storing destination information received from another device in the image processing apparatus in terms of security and other reasons. However, since information related to destination information acquired from another device is not stored in the image processing apparatus, the image processing apparatus also does not store an operation (for example, group information selected for narrowing down destination information) input by the user. Therefore, each time the user transfers destination information to the image processing apparatus, the user needs to select a destination again by narrowing down destinations and the like. Consequently, the number of operations (the number of operation steps) required to select a destination increases, and convenience of the user is impaired.

In view of the above-described issue, an object of the present disclosure is to provide an image processing apparatus and the like that enable a user to efficiently select destination information received from a terminal device.

SUMMARY OF THE INVENTION

To solve the above-described issue, an image processing apparatus according to the present disclosure includes: a receiver that communicates with a terminal device, and receives, from the terminal device, destination information including group information; a selector that selects, in a case where a selected group history indicating that the group information is selected in the past is stored in a storage, one piece of group information from among the group information included in the destination information, based on the selected group history; and a screen displayer that performs control of displaying, on a displayer, destination information including the one piece of group information selected by the selector.

In addition, a control method according to the present disclosure includes: communicating with a terminal device, and receiving, from the terminal device, destination information including group information; in a case where a selected group history indicating that the group information is selected in the past is stored in a storage, selecting one piece of group information from among the group information included in the destination information, based on the selected group history; and displaying, on a displayer, destination information including the one piece of group information selected in the selecting.

The present disclosure can provide an image processing apparatus and the like that enable a user to efficiently select destination information received from a terminal device.

BRIEF DESCRIPTION OF THE DRAWINGS

FIG. 3 is a table illustrating an example of a data structure of address book data to be stored in the terminal device according to the first embodiment.

FIG. 5 is a table illustrating an example of a data structure of address book data to be stored in the image processing apparatus according to the first embodiment.

FIG. 6 is a table illustrating an example of a data structure of a selected group history according to the first embodiment.

FIG. 7 is a table illustrating an example of a data structure of a selected destination history according to the first embodiment.

FIG. 9 is a flowchart illustrating a flow of a processing to be performed by the image processing apparatus according to the first embodiment.

FIG. 10 is a flowchart illustrating a flow of destination selection processing according to the first embodiment.

FIG. 14 is a table illustrating an example of an address book data structure to be stored in the terminal device according to an applied example of the first embodiment.

DESCRIPTION OF THE PREFERRED EMBODIMENTS

Hereinafter, embodiments for implementing the present disclosure are described with reference to the drawings. Note that, the following embodiments are an example for describing the present disclosure, and the technical scope of the invention described in the claims is not limited to the following description.

1. First Embodiment

1.1 Overall Configuration

Figure 1:
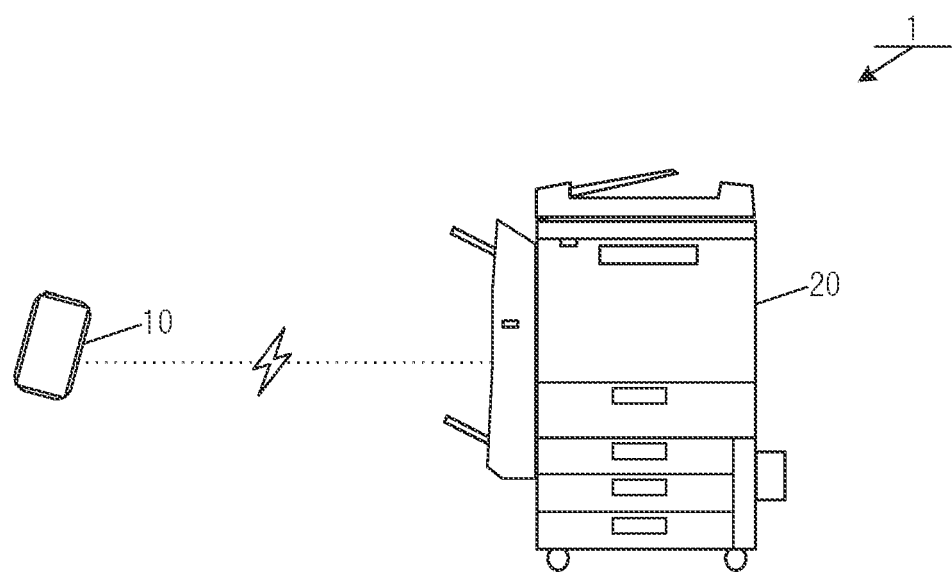
FIG. 1 is a diagram illustrating an overall configuration of a system according to a first embodiment.

A system 1 according to the present embodiment is described with reference to FIG. 1. As illustrated in FIG. 1, the system 1 according to the present embodiment is configured to include a terminal device 10 and an image processing apparatus 20. In addition, the terminal device 10 and the image processing apparatus 20 have a function of performing near field communication.

The terminal device 10 is an information processing device carried by a user. The terminal device 10 is a device such as, for example, a smartphone or a tablet. Note that, the terminal device 10 may be a device such as a smartwatch, a personal computer (PC), or a personal digital assistant (PDA).

The image processing apparatus 20 is an apparatus having a copy function, a print function, a scanner function, a mail function, and the like, and is an apparatus generally called a digital multifunction machine (MFP). Note that, the image processing apparatus 20 may be an image forming apparatus including a means for forming an image on recording paper such as paper or an OHP film by using a method such as an electrophotographic method.

1.2 Functional Configuration

1.2.1 Terminal Device

Figure 2:
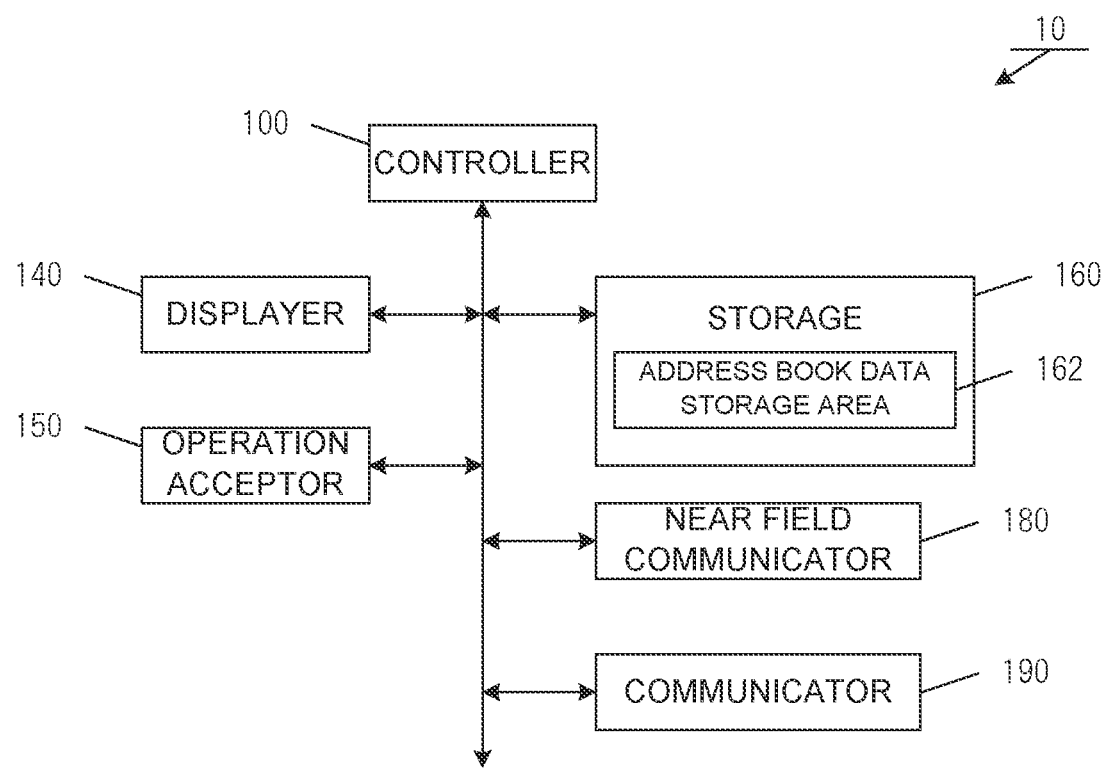
FIG. 2 is a diagram illustrating a functional configuration of a terminal device according to the first embodiment.

A configuration of the terminal device 10 according to the present embodiment is described with reference to FIG. 2. As illustrated in FIG. 2, the terminal device 10 is configured to include a controller 100, a displayer 140, an operation acceptor 150, a storage 160, a near field communicator 180, and a communicator 190.

The controller 100 controls the entirety of the terminal device 10. The controller 100 achieves various functions by reading and executing various programs stored in the storage 160, and is configured of one or more arithmetic devices (e.g., central processing units (CPUs)).

The displayer 140 displays various pieces of information. The displayer 140 is configured of a display device such as, for example, a liquid crystal display (LCD), an organic electro-luminescence (EL) panel, or a micro light emitting diode (LED) display.

The operation acceptor 150 accepts an operation of a user using the terminal device 10. The operation acceptor 150 is configured of an input device such as a touch sensor. A method of detecting an input by a touch sensor may be a general detection method, such as, for example, a resistive film method, an infrared method, an electromagnetic induction method, or a capacitance method. Note that, the terminal device 10 may include a touch panel in which the displayer 140 and the operation acceptor 150 are integrally formed.

The storage 160 stores various programs necessary for an operation of the terminal device 10, and various pieces of data. The storage 160 is configured of a storage device such as, for example, a solid state drive (SSD) being a semiconductor memory, or a hard disk drive (HDD).

The storage 160 secures, as a storage area, an address book data storage area 162. The address book data storage area 162 stores information such as a name of a user and a company name, and information (destination information) related to a destination such as a destination of data and a group to which the user belongs. The destination information is information to be displayed or managed by a function generally called an address book or a phone book. Note that, in the present embodiment, destination information is described as address book data.

An example of a data structure of address book data to be stored in the address book data storage area 162 is illustrated in FIG. 3. As illustrated in FIG. 3, a name of a user (e.g., "business partner 1"), a phone number of the user (e.g., "03-1111-2222"), an e-mail address of the user (e.g., "info@a-sha.com"), and a group name (e.g., "business partner") are stored in address book data to be stored in the address book data storage area 162.

A group name is attribute information for a user to be stored in address book data. Specifically, a group name is a value (attribute value) of a "group" being an attribute for use in classifying the user. For example, an example illustrated in FIG. 3 indicates that, for each piece of address book data, a group name such as "business partner" or "employee" is stored as a specific value (attribute value) of an attribute with respect to the attribute (attribute name) called "group".

Note that, the attribute may be information such as, for example, a label, a tag, a category, or a so-called favorite. Information such as a label, a tag, or a favorite is information for use in classifying (grouping) users or address book data. In other words, information such as a label, a tag, or a favorite is a type of group information.

In a case where an attribute is a label or a favorite, the following information is stored as the attribute.

Label (Tag/Category)

One or more pieces of classification information are stored as an attribute value. The classification information is information for identifying a label (tag/category). The classification information is a name (label name) of a label or the like, identification information (label ID) for specifying a label name, or the like. Note that, in a case where identification information is stored as classification information, the storage 160 stores information in which the identification information and a name of a label or the like are associated with each other. This makes it possible for the terminal device 10 to specify a name of a label or the like from identification information.

Favorite

Information capable of distinguishing whether address book data are designated as a favorite by the user is stored as an attribute value. Specifically, information such as "yes" or "no" may be stored as an attribute value, or a flag may be stored. In addition, predetermined information may be stored in an attribute value of address book data that are designated as a favorite, and no information may be stored in an attribute value of address book data that are not designated as a favorite. In this case, it is determined whether address book data are a favorite by presence or absence of an attribute value.

Note that, an attribute to be stored in one piece of address book data may be plural. For example, an attribute of a group, and an attribute of a label may be stored in one piece of address book data.

In addition, a plurality of telephone codes or e-mail addresses may be stored in address book data to be stored in the address book data storage area 162. In addition to the above-described information, information such as furigana of names, facsimile numbers, addresses, company names, department names, and memos may be stored in address book data to be stored in the address book data storage area 162.

The near field communicator 180 performs wireless communication with another device located around the terminal device 10. The near field communicator 180 is configured of, for example, a communication device including an antenna. A wireless communication method used by the near field communicator 180 may be any method, as far as the method is a wireless communication method generally used in near field communication, such as, for example, Bluetooth (registered trademark), near field communication (NFC), Zig-Bee (registered trademark), or a wireless USB.

The communicator 190 performs communication with an external device via a local area network (LAN) or a wide area network (WAN). The communicator 190 is configured of, for example, a network interface card (NIC) used in a wired/wireless LAN, or a communication module connectable to long term evolution (LTE)/LTE-Advanced (LTE-A)/license-assisted access using LTE (LAA)/5G lines.

1.2.2 Image Processing Apparatus

Figure 4:
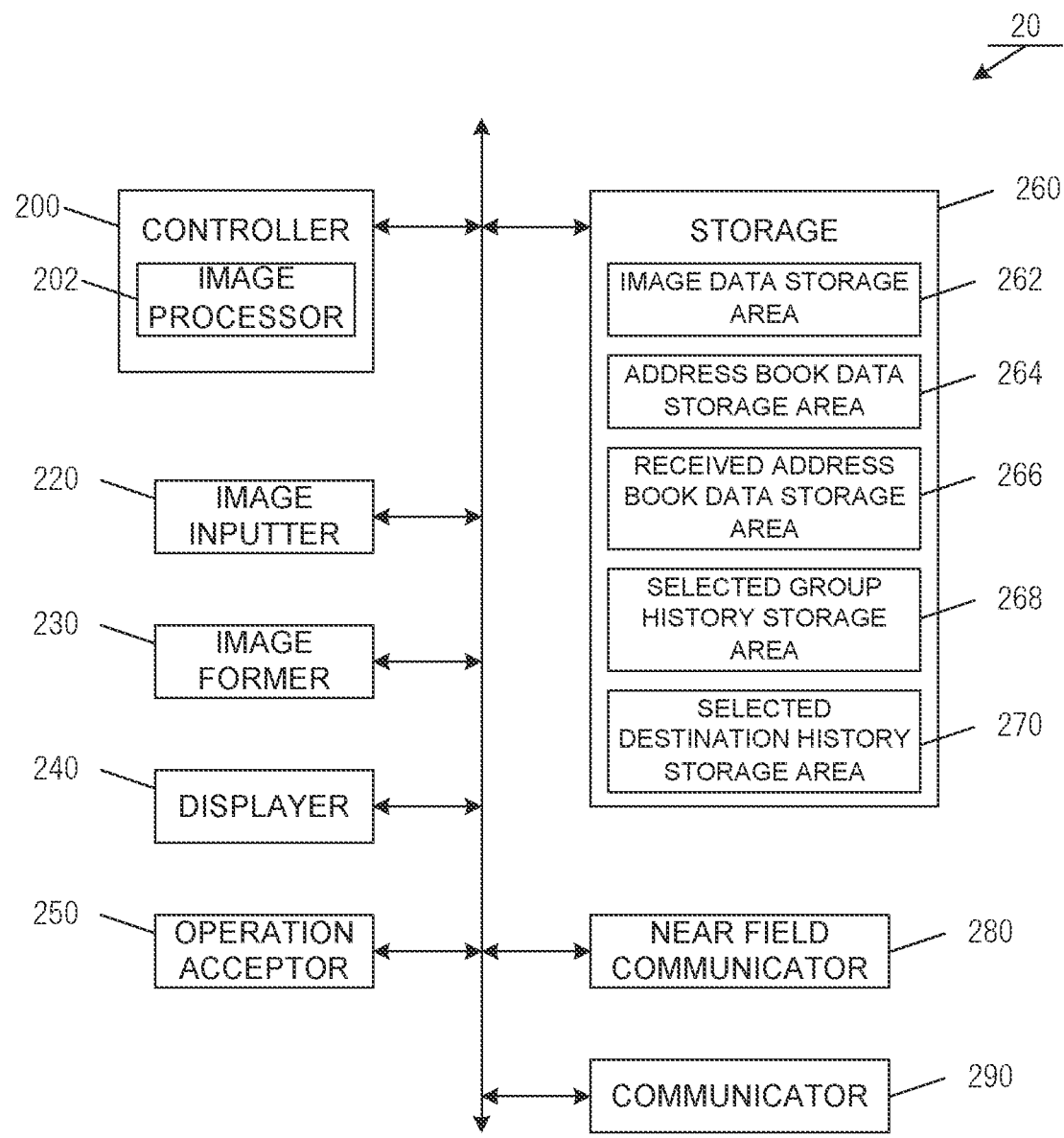
FIG. 4 is a diagram illustrating a functional configuration of an image processing apparatus according to the first embodiment.

A configuration of the image processing apparatus 20 according to the present embodiment is described with reference to FIG. 4. As illustrated in FIG. 4, the image processing apparatus 20 is configured to include a controller 200, an image inputter 220, an image former 230, a displayer 240, an operation acceptor 250, a storage 260, a near field communicator 280, and a communicator 290.

The controller 200 controls the entirety of the image processing apparatus 20. The controller 200 achieves various functions by reading and executing various programs stored in the storage 260, and is configured of one or more arithmetic devices (e.g., CPUs).

The image inputter 220 reads a document, and inputs data of a read image. For example, the image inputter 220 is configured of a scan device or the like including a device that converts optical information of a contact image sensor (CIS), a charge coupled device (CCD), or the like into electrical signals, and reads a document placed on a loading table of the image processing apparatus 20. Note that, the image inputter 220 may be configured of an interface (terminal) for reading an image stored in a universal serial bus (USB) memory.

The image former 230 forms (prints) an image on a recording medium such as recording paper. The image former 230 is configured of, for example, a laser printer or the like using an electrophotographic method.

The displayer 240 displays various pieces of information. The displayer 240 is configured of a display device such as, for example, an LCD, an organic EL panel, or a micro LED display.

The operation acceptor 250 accepts an operation of a user using the image processing apparatus 20. The operation acceptor 250 is configured of hardware keys (physical keys, a numeric keypad), and an input device such as a touch sensor. A method of detecting an input by a touch sensor may be a general detection method such as, for example, a resistive film method, an infrared method, an electromagnetic induction method, or a capacitance method. Note that, the image processing apparatus 20 may include a touch panel in which the displayer 240 and the operation acceptor 250 are integrally formed.

The storage 260 stores various programs necessary for an operation of the image processing apparatus 20, and various pieces of data. The storage 260 is configured of a storage device such as, for example, a SSD being a semiconductor memory, or an HDD.

The storage 260 secures, as storage areas, an image data storage area 262, an address book data storage area 264, a received address book data storage area 266, a selected group history storage area 268, and a selected destination history storage area 270.

The image data storage area 262 stores image data of an image input by the image inputter 220. The image data may be, for example, data (print data) representing an image to be formed by the image former 230, or a file in a format readable by another device.

The address book data storage area 264 stores data (address book data) to be displayed or managed by a function generally called an address book or a phone book. An example of a data structure of address book data to be stored in the address book data storage area 264 is illustrated in FIG. 5. As illustrated in FIG. 5, a name of a user (e.g., "Takagi xx"), a facsimile number of the user (e.g., "03-0987-6543"), and an e-mail address of the user (e.g., "takagi@example.com") are stored in address book data to be stored in the address book data storage area 264.

A plurality of e-mail addresses and facsimile numbers may be stored in address book data to be stored in the address book data storage area 264. In addition to the above-described information, information such as addresses, company names, department names, and memos, and attribute information may be stored in address book data to be stored in the address book data storage area 264.

The received address book data storage area 266 stores address book data received from the terminal device 10. A data structure of address book data to be stored in the received address book data storage area 266 is the same as that of address book data to be stored in the address book data storage area 162 illustrated in FIG. 3.

The selected group history storage area 268 stores information (selected group history) on a group name selected by the user, when narrowing down address book data received from the terminal device 10. Specifically, the selected group history is information is group information such as a group name included in address book data received from the terminal device 10, and information indicating a group selected when performing an operation of narrowing down address book data received from the terminal device 10 in the past.

An example of a data structure of a selected group history is illustrated in FIG. 6. As illustrated in FIG. 6, a terminal device ID (e.g., "35-123456-789012-3") for identifying the terminal device 10, and a group name (e.g., "business partner") selected by the user are stored in the selected group history.

The terminal device ID is unique information associated with the terminal device 10. The terminal device ID may be information such as, for example, an international mobile equipment identifier (IMEI) associated with a subscriber identity module (SIM) card to be mounted in the terminal device 10, a serial number, or a phone number.

The selected destination history storage area 270 stores a history (selected destination history) of a destination selected by the user. An example of a data structure of the selected destination history is illustrated in FIG. 7. As illustrated in FIG. 7, a terminal device ID (e.g., "35-123456-789012-3") for identifying the terminal device 10, a destination (e.g., "eigyo@b-sha.com"), and a transmission date and time (e.g., "Jan. 15, 2021 19:02:21") are stored in the selected destination history.

The destination is information indicating a transmission destination of image data, and, for example, an e-mail address or a facsimile number is stored.

Note that, a terminal device ID may not be stored in a selected destination history. Specifically, as far as the destination is a destination selected from address book data acquired from the terminal device 10, identification information of the terminal device 10 is stored as a terminal device ID. On the other hand, when the destination is a destination selected from address book data stored in the image processing apparatus 20, a terminal device ID is not stored.

The near field communicator 280 performs wireless communication with another device located around the image processing apparatus 20. The near field communicator 280 is configured of, for example, a communication device including an antenna. A wireless communication method to be used by the near field communicator 280 may be any method, as far as the method is a wireless communication method to be generally used in near field communication such as, for example, Bluetooth, NFC, ZigBee, or a wireless USB.

The communicator 290 performs communication with another device. The communicator 290 is configured of, for example, a communication device such as NIC to be used in a wired/wireless LAN, or a communication module, and performs communication with another device via a LAN or a WAN. Further, the communicator 290 is connectable to a communication network such as a public line network, a LAN, or the Internet, and may be configured in such a way that image data can be transmitted and received to and from an external device via a communication network by a communication method such as facsimile or an e-mail.

1.3 Flow of Processing

1.3.1 Terminal Device

Figure 8:
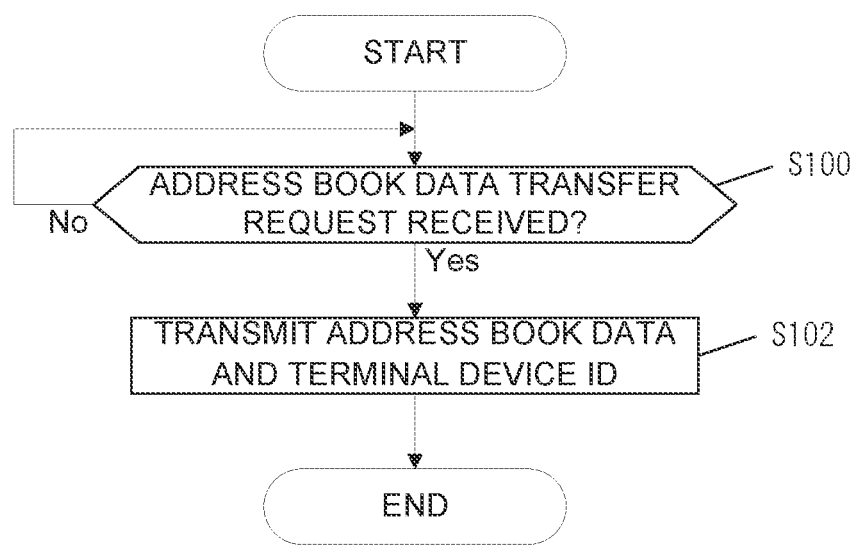
FIG. 8 is a flowchart illustrating a flow of processing to be performed by the terminal device in the first embodiment.

Processing to be performed by the terminal device 10 is described with reference to FIG. 8. Processing illustrated in FIG. 8 is performed by causing the controller 100 to read a program stored in the storage 160. Further, it is assumed that the terminal device 10 and the image processing apparatus 20 are in a communicable state in advance by pairing or an operation equivalent to pairing.

First, the controller 100 determines whether a request (address book data transfer request) for transferring address book data has been received from the image processing apparatus 20 via the near field communicator 180 (Step S100).

When the controller 100 determines that an address book data transfer request has been received, the controller 100 reads all pieces of address book data stored in the address book data storage area 162. Next, the controller 100 transmits, to the image processing apparatus 20 that has transmitted the address book data transfer request, a terminal device ID (e.g., an IMEI, a serial number, or a phone number), and the read address book data via the near field communicator 180 (Step S100; Yes→Step S102).

For example, the controller 100 collectively transmits (transfers), to the image processing apparatus 20, address book data stored in the address book data storage area 162 by using a Bluetooth profile such as an object push profile (OPP), or a phone book access profile (PBAP).

Note that, when the controller 100 determines that an address book data transfer request has not been received, the controller 100 repeats processing of Step S100 (Step S100; No).

1.3.2 Image Processing Apparatus

Processing to be performed by the image processing apparatus 20 is described with reference to FIGS. 9 and 10. Processing illustrated in FIGS. 9 and 10 is performed by causing the controller 200 to read a program stored in the storage 260, and specifically performed, when execution of a job of transmitting image data to another device is instructed. It is assumed that the image processing apparatus 20 and the terminal device 10 are in a communicable state in advance by pairing or an operation equivalent to pairing.

First, processing illustrated in FIG. 9 is described. First of all, the controller 200 acquires image data via the image inputter 220 (Step S110). Note that, the controller 200 may store image data of an image acquired in S110 in the image data storage area 262.

Next, the controller 200 determines whether to use address book data stored in the terminal device 10 (Step S112). For example, the controller 200 displays, on the displayer 240, a button such as "refer to a phone book of an external device", and when the button is selected by the user, it is determined that address book data are used.

When the controller 200 determines that address book data stored in the terminal device 10 are used, the controller 200 transmits an address book data transfer request to the terminal device 10 via the near field communicator 280 (Step S112; Yes→Step S114). Thereafter, the controller 200 receives, from the terminal device 10, address book data, and a terminal device ID of the terminal device 10 via the near field communicator 280 (Step S116).

Next, the controller 200 stores, in the received address book data storage area 266, the address book data received from the terminal device 10 (Step S118). At this occasion, the controller 200 extracts a group name from the received address book data (Step S120). For example, in Step S118, when the controller 200 receives address book data illustrated in FIG. 3, the controller 200 extracts "business partner" and "employee,", which are group names stored in the received address book data.

Next, the controller 200 displays a destination selection screen on the displayer 240 (Step S122). The destination selection screen is a screen for allowing a user to select a destination (transmission destination) of image data acquired in Step S110. For example, the controller 200 performs processing of generating a screen including a list from which address book data stored in Step S118 are selectable, and a list from which a group name extracted in Step S120 is selectable, and displaying the screen on the displayer 240.

Note that, the controller 200 may further add, in a list from which a group name extracted in Step S120 is selectable, an item (e.g., "no designation") indicating that no group name is selected.

Next, the controller 200 performs processing (destination selection processing) for selecting a destination of image data, based on a user's operation to be input via a screen displayed in Step S122 (Step S124). Destination selection processing is described with reference to FIG. 10.

First, the controller 200 determines whether a selected group history associated with the terminal device 10 that has transmitted address book data is present (Step S160). For example, the controller 200 searches, in the selected group history storage area 268, a selected group history in which the same information as the terminal device ID received in Step S116 is stored. When the controller 200 is successful in searching a selected group history, the controller 200 determines that a selected group history associated with the terminal device 10 that has transmitted address book data is present.

When the controller 200 determines that a selected group history is present, the controller 200 selects a group name, based on the selected group history (Step S160; Yes→Step S162). For example, the controller 200 selects, in a list from which a group name included in a destination selection screen displayed in Step S122 is selectable, an item associated with a group name stored in a selected group history searched in Step S160.

On the other hand, when the controller 200 determines that a selected group history is not present, the controller 200 selects one group name (e.g., a default group name) by a predetermined method (Step S160; No→Step S164). For example, the controller 200 selects, as a default group name, a group name that has been extracted first from among the group names extracted in Step S120. Note that, the controller 200 may select, as a default group name, an item (e.g., "no designation") indicating that no group name is selected.

Then, the controller 200 displays address book data in which the selected group name is stored (Step S166). For example, the controller 200 reads, from the address book data storage area 264, address book data in which the same group name as the group name selected in Step S162 or Step S164 is stored. Then, the controller 200 displays the read address book data in a list from which address book data are selectable. Note that, in the present embodiment, displaying address book data means performing display based on data stored in address book data. For example, as processing of displaying address book data, the controller 200 performs processing of displaying a name stored in address book data, as characters at a predetermined position (e.g., a list from which address book data are selectable) on the displayer 240.

Next, the controller 200 determines whether a group name has been selected by the user (Step S168). For example, the controller 200 determines that a group name has been selected by the user, when the user performs an operation of changing a selected item in a list from which a group name displayed on a destination selection screen is selectable.

When the controller 200 determines that a group name has been selected by the user, the controller 200 updates address book data displayed by processing in Step S166 to display of address book data in which the selected group name is stored (Step S168; Yes→Step S170). Processing in Step S170 is the same as processing in Step S166. Thus, the controller 200 can narrow down address book data received from the terminal device 10, and display a result of narrowing down on a destination selection screen by performing processing in Steps S168 and S170.

On the other hand, when the controller 200 determines that a group name has not been selected, the controller 200 determines whether address book data have been selected (Step S168; No→Step S172). Note that, in the present embodiment, selecting address book data means selecting one piece of address book data from among displayed address book data. For example, when a name stored in address book data is displayed as characters at a predetermined position on the displayer 240, and when the user selects the displayed characters, the controller 200 determines that address book data have been selected.

When the controller 200 determines that address book data have been selected, the controller 200 selects, as a destination of image data, an address associated with the selected piece of address book data (Step S172; Yes→Step S174). The address is a facsimile number or an e-mail address. When the controller 200 transmits image data acquired in Step S110 to another device via a facsimile line, the controller 200 selects a facsimile number as a destination. On the other hand, when the controller 200 transmits an e-mail to another device with attached image data acquired in Step S110, the controller 200 selects an e-mail address, as a destination.

Next, the controller 200 stores the selected group history (Step S176). For example, the controller 200 stores, in the selected group history storage area 268, a selected destination history including a terminal device ID received in Step S116, and a group name selected on a destination selection screen. Note that, when a selected destination history storing the same information as the terminal device ID received in Step S116 is stored in the selected group history storage area 268, the controller 200 updates a group name included in the stored selected destination history to the group name selected on the destination selection screen.

Note that, in Step S172, when the controller 200 determines that address book data have not been selected, processing returns to Step S168 (Step S172; No→Step S168).

By the above-described processing, a destination associated with address book data selected by the user is selected as a transmission destination of image data, and a group name selected on a destination selection screen at that time is stored as a selected group history.

Referring back to FIG. 9, the controller 200 transmits image data acquired in Step S110 to a destination selected in Step S124 via the communicator 290 (Step S126).

Next, the controller 200 stores the selected destination history (Step S128). For example, the controller 200 stores, in the selected destination history storage area 270, a selected destination history including a terminal device ID received in Step S116, a destination selected in Step S174, and a date and time when image data have been transmitted.

Next, the controller 200 deletes, from the received address book data storage area 266, address book data (address book data received from the terminal device 10) stored in Step S118 (Step S130).

1.4 Operation Example

Figure 11A:
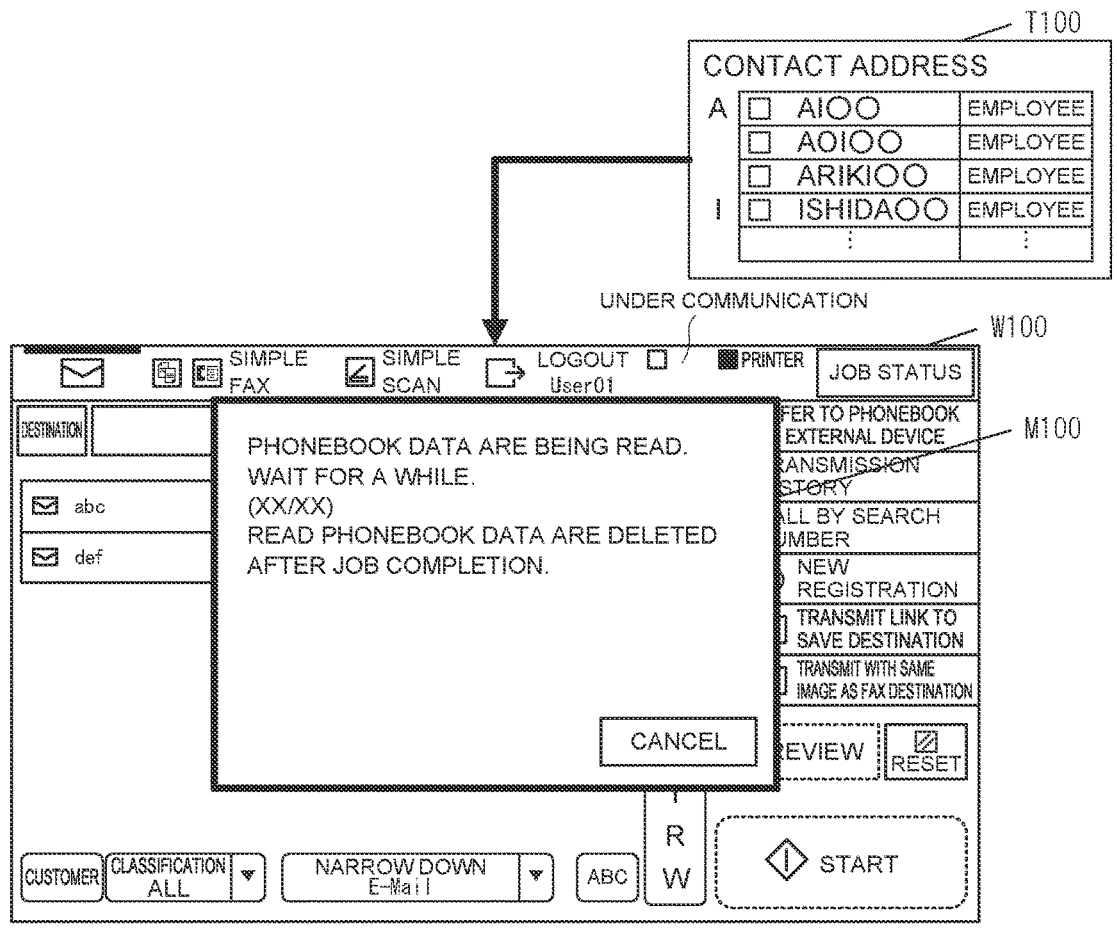
FIGS. 11A and 11B are diagrams illustrating an operation example according to the first embodiment.
Figure 11B:
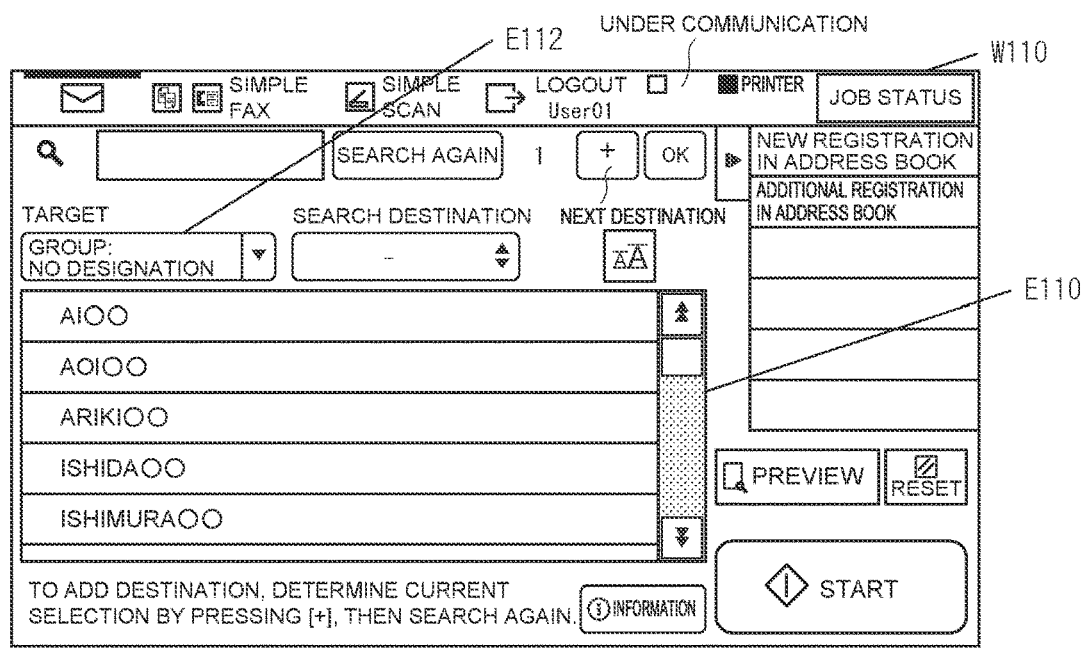

Next, an operation example according to the present embodiment is described with reference to FIG. 11A through FIG. 13B. FIGS. 11A and 11B are diagrams illustrating a case where address book data are transferred from a certain terminal device 10 (target terminal device) to the image processing apparatus 20 for the first time.

FIG. 11A is an example illustrating a display screen W100 to be displayed on the displayer 240, when address book data T100 stored in a target terminal device are transferred to the image processing apparatus 20. A message M100 indicating that address book data are transferred is displayed on the display screen W100.

FIG. 11B is an example illustrating a display screen W110 to be displayed on the displayer 240, when address book data transfer from a target terminal device to the image processing apparatus 20 is completed. As illustrated in FIG. 11B, the display screen W110 includes a list E110 for selecting address book data received from a target terminal device, and a list E112 for selecting a group name.

Herein, since address book data are transferred from a target terminal device for the first time, a group name stored in the address book data received from the target terminal device has never been selected in the image processing apparatus 20. In other words, the image processing apparatus 20 does not store a selected group history associated with the target terminal device. Consequently, a default group name (e.g., "no designation") is selected in the list E112 for selecting a group name.

Figure 12A:
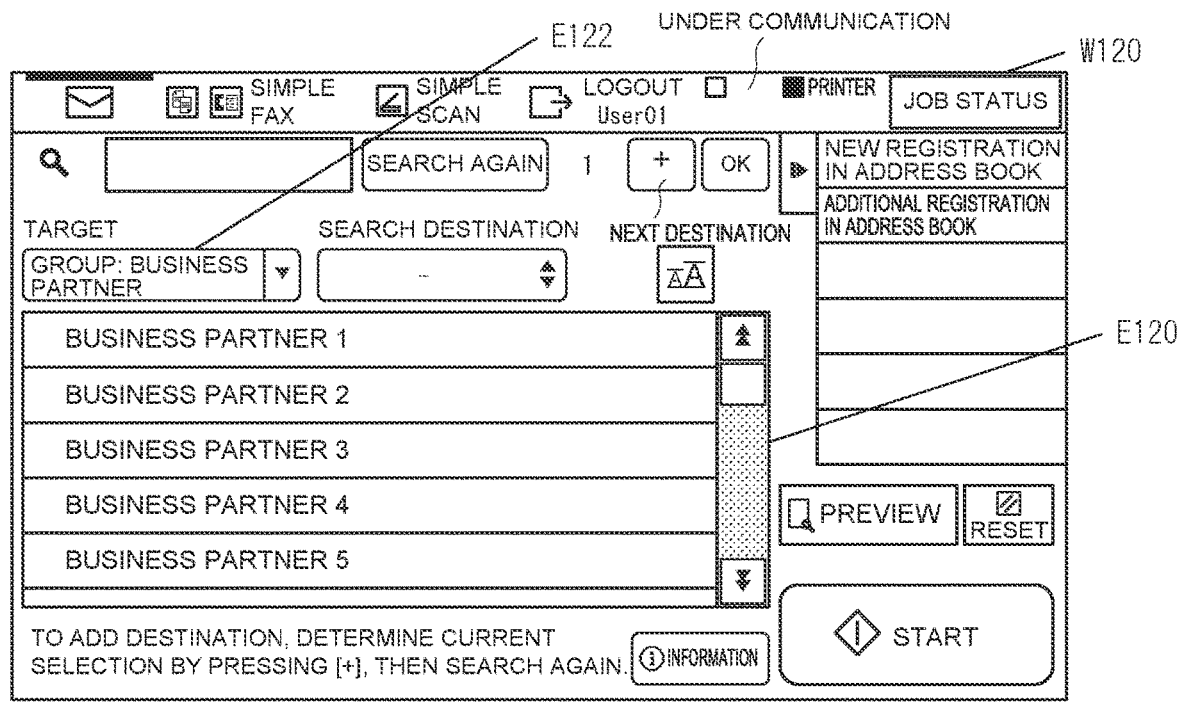
FIGS. 12A and 12B are diagrams illustrating an operation example according to the first embodiment.
Figure 12B:
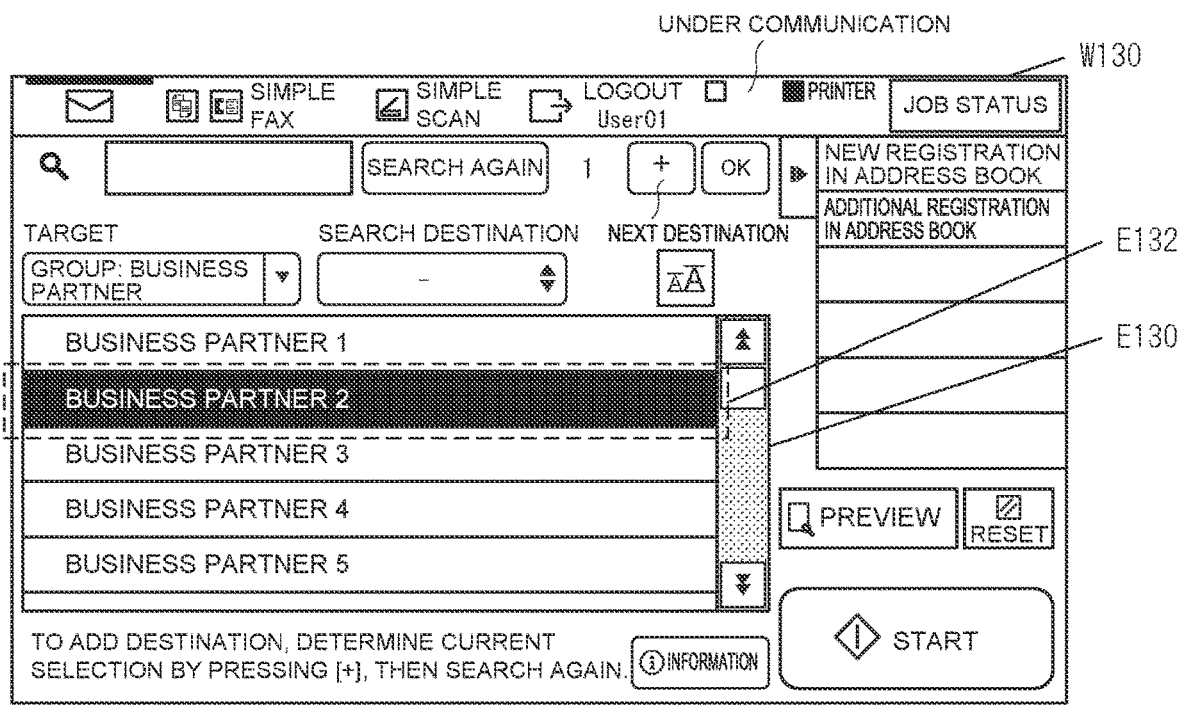

FIGS. 12A and 12B are diagrams illustrating a case where a group name is selected in the display screen W110. FIG. 12A is an example illustrating a display screen W120 to be displayed on the displayer 240, when one group name is selected by the user. For example, FIG. 12A illustrates a case where "business partner" is selected as a group name by the user. As illustrated in FIG. 12A, "business partner" is selected in a list E122 for selecting a group name. In addition, address book data in which "business partner" is stored as a group name (e.g., a name stored in address book data) is displayed in a list E120 for selecting address book data.

FIG. 12B is an example illustrating a display screen W130 to be displayed on the displayer 240, when address book data are selected by the user. As illustrated in FIG. 12B, for example, the user selects an item E132 of address book data (e.g., "business partner 2") in a list E130 for selecting address book data. In this case, FIG. 12B displays the item E132 in a highlighted manner.

Further, at this occasion, when image data are transmitted, the image processing apparatus 20 stores, as a selected group history associated with the target terminal device, "business partner", which is a group name selected by the user.

Figure 13A:
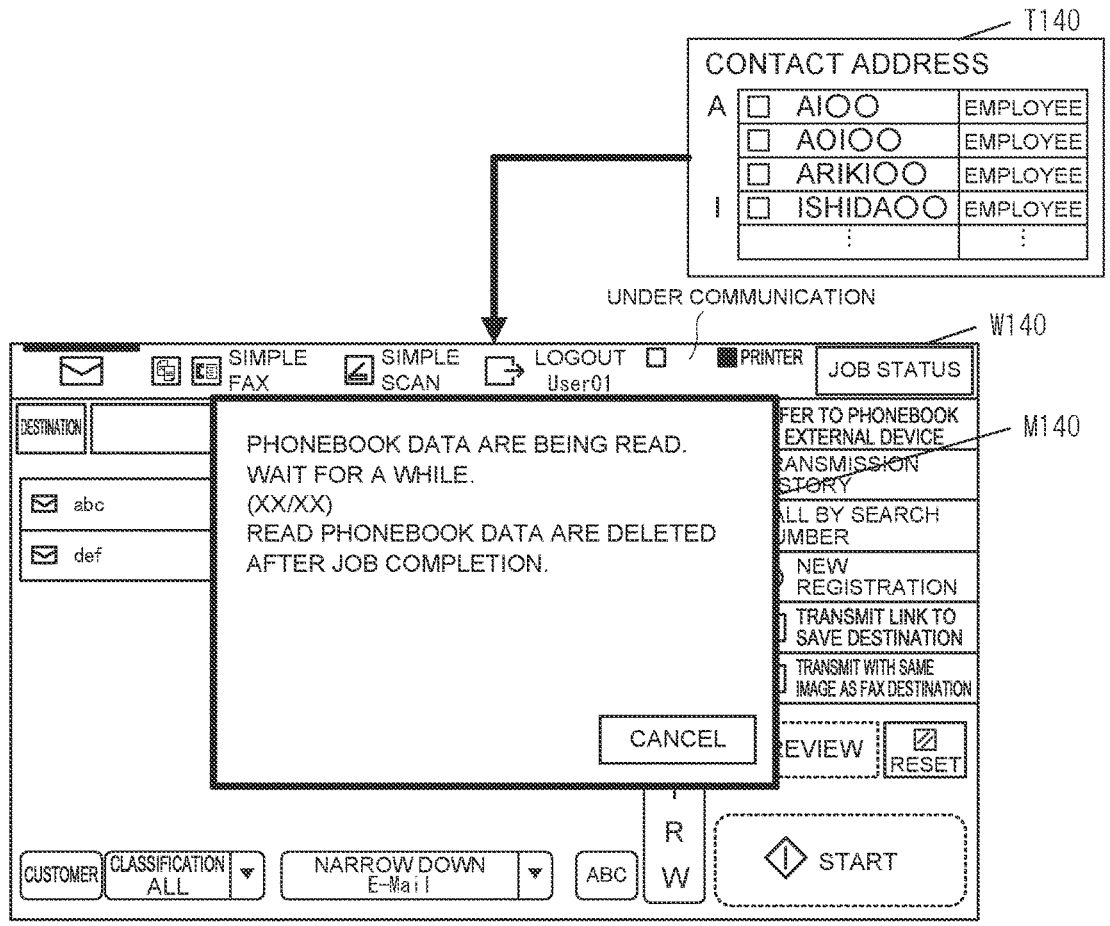
FIGS. 13A and 13B are diagrams illustrating an operation example according to the third embodiment.
Figure 13B:
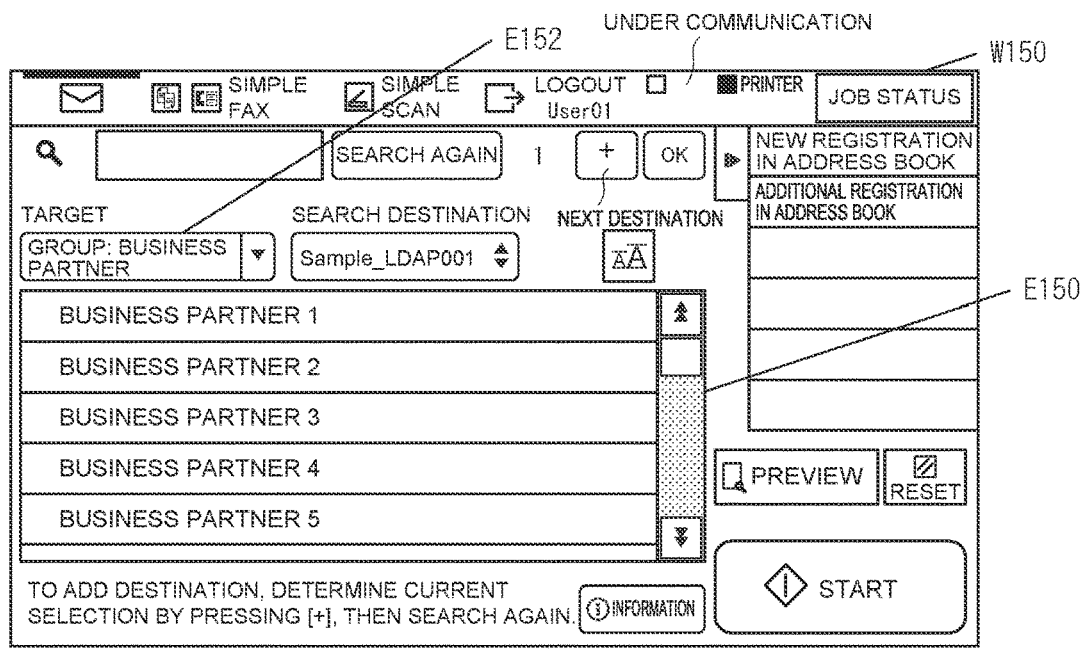

FIGS. 13A and 13B are diagrams illustrating a case where address book data are transferred from a target terminal device to the image processing apparatus 20 again. FIG. 13A is an example illustrating a display screen W140 to be displayed on the displayer 240, when address book data T140 stored in a target terminal device are transferred to the image processing apparatus 20. A message M140 indicating that address book data are transferred is displayed on the display screen W140.

FIG. 13B is an example illustrating a display screen W150 to be displayed on the displayer 240, when address book data transfer from a target terminal device to the image processing apparatus 20 is completed. As illustrated in FIG. 11B, the display screen W150 includes a list E150 for selecting address book data received from a target terminal device, and a list E152 for selecting one group name from among group names stored in the address book data.

Herein, the image processing apparatus 20 stores a selected group history associated with a target terminal device. For example, in a case where a group name "business partner" is stored in a selected group history associated with a target terminal device, "business partner" is selected in the list E152, and address book data storing "business partner" are displayed as a group name in the list E150. This allows the user to confirm that the group name called "business partner" is selected in advance. In addition, the user can select, in the list E150, address book data storing "business partner" as a group name without an operation of selecting "business partner" in the list E152.

Note that, the embodiment has been described based on a premise that one selected group history is stored for one terminal device 10. Thus, when address book data are transferred from the terminal device 10 to the image processing apparatus 20, the image processing apparatus 20 can display a destination selection screen in a state that a group having a latest transmission date (a group name selected at a last time by the user) is selected in advance. In other words, the image processing apparatus 20 can preferentially display a group having a latest transmission date. Alternatively, a plurality of selected group histories may be stored for one terminal device 10.

In this case, in Step S176 in FIG. 10, the controller 200 stores, in addition to a terminal device ID and a group name, information on a date and time when the group name is selected by the user, as selected group history information.

In addition, in Step S162 in FIG. 10, the controller 200 extracts, from selected group information associated with the terminal device 10 that has transmitted address book data, a predetermined number of pieces of selected group information from a latest date and time, and compiles group names. Then, the controller 200 selects a group name that is stored most frequently. Thus, the controller 200 can select a group having a highest transmission frequency (a group name that is selected most frequently by the user).

Note that, in a case where a plurality of group names become groups having a highest transmission frequency, as a result of compiling group names, the controller 200 selects a group name that is selected at a last time by the user from among the plurality of group names. Note that, the controller 200 may select, from among the plurality of group names, a group in which a recent transmission frequency is highest (e.g., a group name having a large number of times of selection for a predetermined period of time, or a group name in which a time interval between selected dates and times is shortest).

1.5 Applied Example

An applied example of the present embodiment is described with reference to FIGS. 14 to 15B. The applied example is an example of a case where attributes of a plurality of groups are allocated to address book data to be stored by the terminal device 10.

FIG. 14 illustrates an example of a data structure of address book data in the applied example. Similarly to FIG. 3, a name of a user, a phone number of the user, an e-mail address of the user, and a group name (e.g., "business partner") are stored in address book data to be stored in the address book data storage area 162. Herein, in the applied example, a plurality of group names can be stored as a group name, such as "business partner, product A".

Further, in the applied example, in Step S176 in FIG. 10, the controller 200 stores, as a selected group history, a group name selected by the user. In addition, in Step S162 in FIG. 10, the controller 200 selects a group name stored in a selected group history associated with the terminal device 10 that has transferred address book data. Thus, the controller 200 can display a destination selection screen in a state that a group name selected by the user at a last time is selected in advance.

Figure 15A:
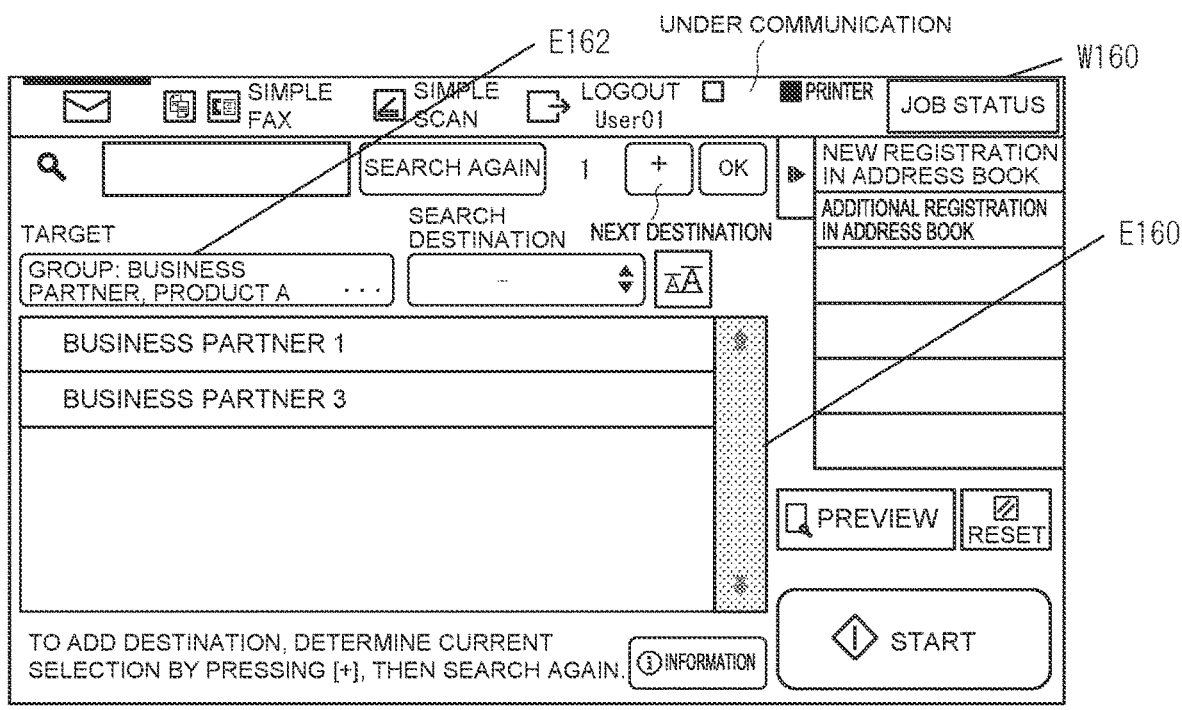
FIGS. 15A and 15B are diagrams illustrating an operation example according to the applied example of the first embodiment.

An operation example in the applied example is described with reference to FIGS. 15A and 15B. FIG. 15A is an example illustrating a display screen W160 to be displayed on the displayer 240, when address book data transfer from the terminal device 10 to the image processing apparatus 20 is completed. The display screen W160 includes a list E160 for selecting address book data received from the terminal device 10, and a button E162 for selecting zero or more group names.

FIG. 15A illustrates a case where "business partner, product A" is selected as a group name. In this case, address book data in which "business partner" and "product A" are stored as a group name are displayed in the list E160. Note that, when a plurality of group names are selected, the controller 200 may display, in the list E160, address book data in which all the selected group names are stored, or may display, in the list E160, address book data in which any of the selected group names is stored.

Figure 15B:
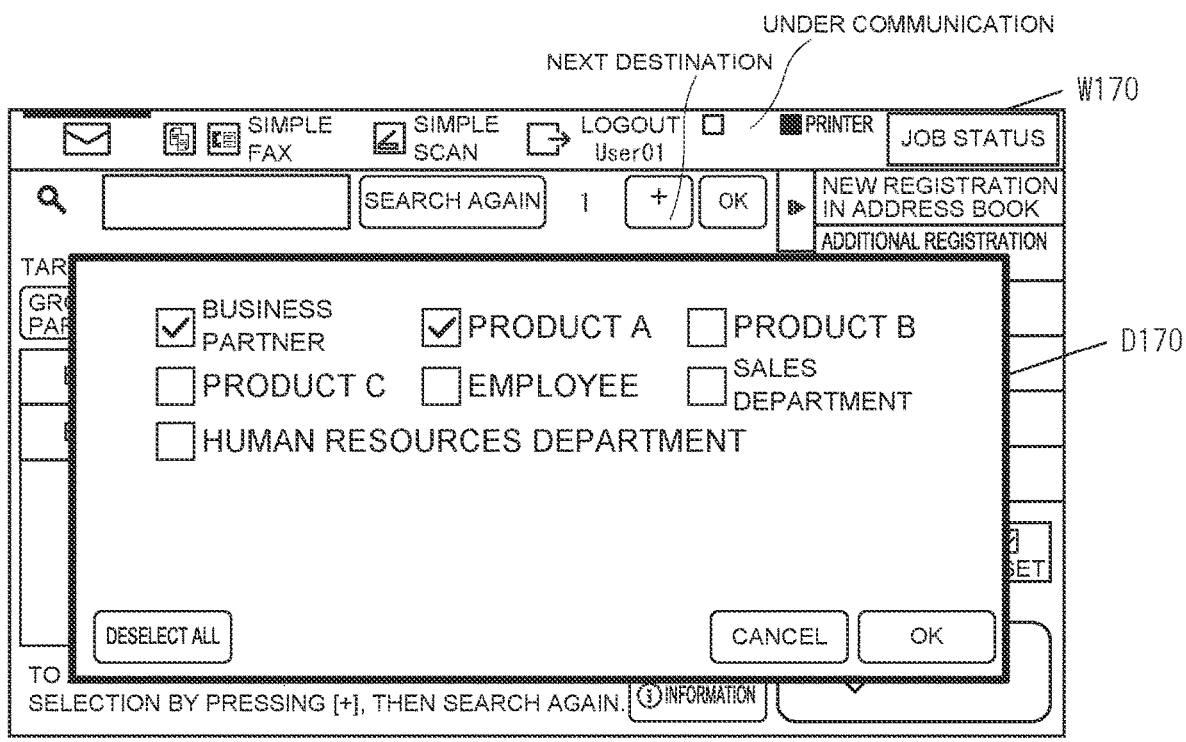

FIG. 15B is an example illustrating a display screen W170 to be displayed on the displayer 240, when the button E162 is selected. A dialog D170 capable of selecting zero or more groups is displayed in the display screen W170. For example, group names extracted in Step S120 in FIG. 9, and checkboxes associated with the group names are displayed as a list in the dialog D170. The user selects zero or more group names by operating the checkboxes.

Note that, the present embodiment has been described based on a premise that a group name is stored as an attribute for a user to be stored in address book data. Alternatively, the attribute may be a label, a tag, a category, or a favorite. For example, information such as an attribute value "yes" or "no" may be stored for an attribute name "favorite" in address book data. In this case, the image processing apparatus 20 makes it selectable, on a destination selection screen, whether only address book data in which "yes" is stored as an attribute value of "favorite" are displayed, or all pieces of address book data are displayed, and displays address book data, based on a selected content. In addition, the controller 200 stores the selected content in selected group information. Thus, when address book data are transferred again from the terminal device 10, the controller 200 can display either one of only the address book data in which "yes" is stored as an attribute value of "favorite", or all the pieces of address book data.

In this way, in the image processing apparatus according to the present embodiment, when a destination to be selected by the user for the second time and thereafter is a destination included in a group (group name) selected by the user in the past, the group is preferentially displayed. Therefore, the user does not need an operation of changing a group to be displayed, and the number of operation steps is reduced. Thus, the image processing apparatus according to the present embodiment allows the user to efficiently select a destination, even when the destination is based on address book data transferred from a terminal device.

2. Second Embodiment

Next, a second embodiment is described. The second embodiment is an embodiment in which an image processing apparatus displays a destination that has been selected by the user in a highlighted manner (in a distinguishable manner). The present embodiment is an embodiment in which FIG. 10 in the first embodiment is replaced with FIG. 16. Note that, same processing is indicated with a same reference sign, and description thereof is omitted.

Figure 16:
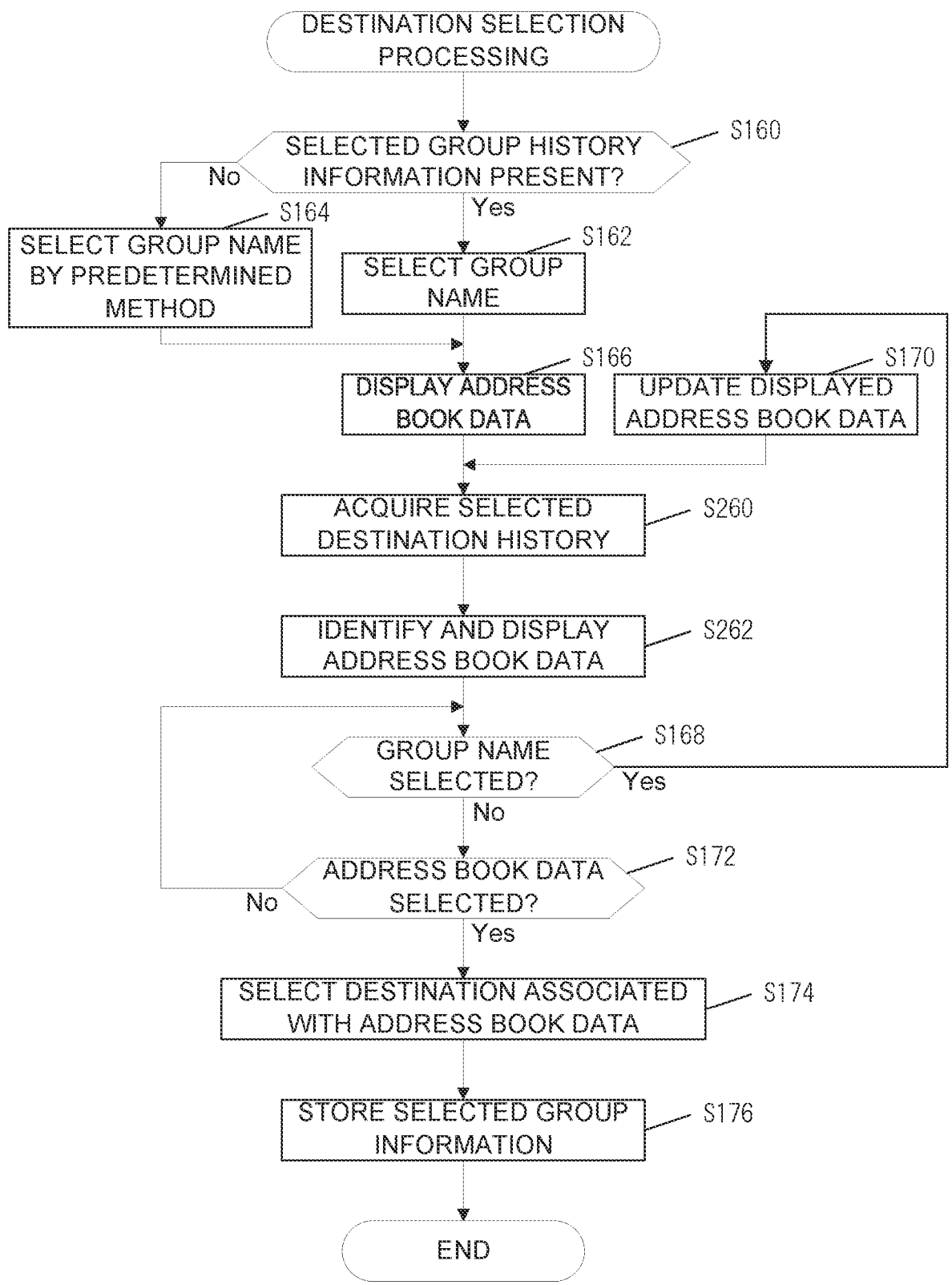
FIG. 16 is a flowchart illustrating a flow of destination selection processing according to a second embodiment.

A flow of destination selection processing according to the present embodiment is described with reference to FIG. 16. After displaying address book data in Step S166, or updating address book data displayed in Step S170, a controller 200 acquires a selected destination history (Step S260). For example, the controller 200 searches, in a selected destination history storage area 270, a selected destination history in which the same information as a terminal device ID received in Step S116 is stored. When the controller 200 is successful in searching a selected destination history, the controller 200 acquires the searched selected destination history.

Next, the controller 200 identifies and displays address book data in which the same destination as a destination stored in the selected destination history acquired in Step S260 is stored (Step S262). For example, the controller 200 identifies and displays, among address book data displayed in Step S166 or Step S170, address book data in which the same information as the destination stored in the selected destination history acquired in Step S260 is stored. This allows the controller 200 to display address book data in which the same information as a destination stored in a selected destination history is stored in a different manner from another piece of address book data.

Note that, the controller 200 may identify and display address book data, based on one or a predetermined number of selected destination histories among selected destination histories acquired in Step S260. In this way, the controller 200 can limit address book data to be identified and displayed by limiting a selected destination history to be used in identification display processing.

An identification display method is, for example, a method of displaying a background color different from a normal background color, decorating or blinking characters (e.g., a name) based on address book data, or displaying a mark (icon) next to characters based on address book data. Note that, a method other than the above-described methods may be selected as an identification display method.

Figure 17A:
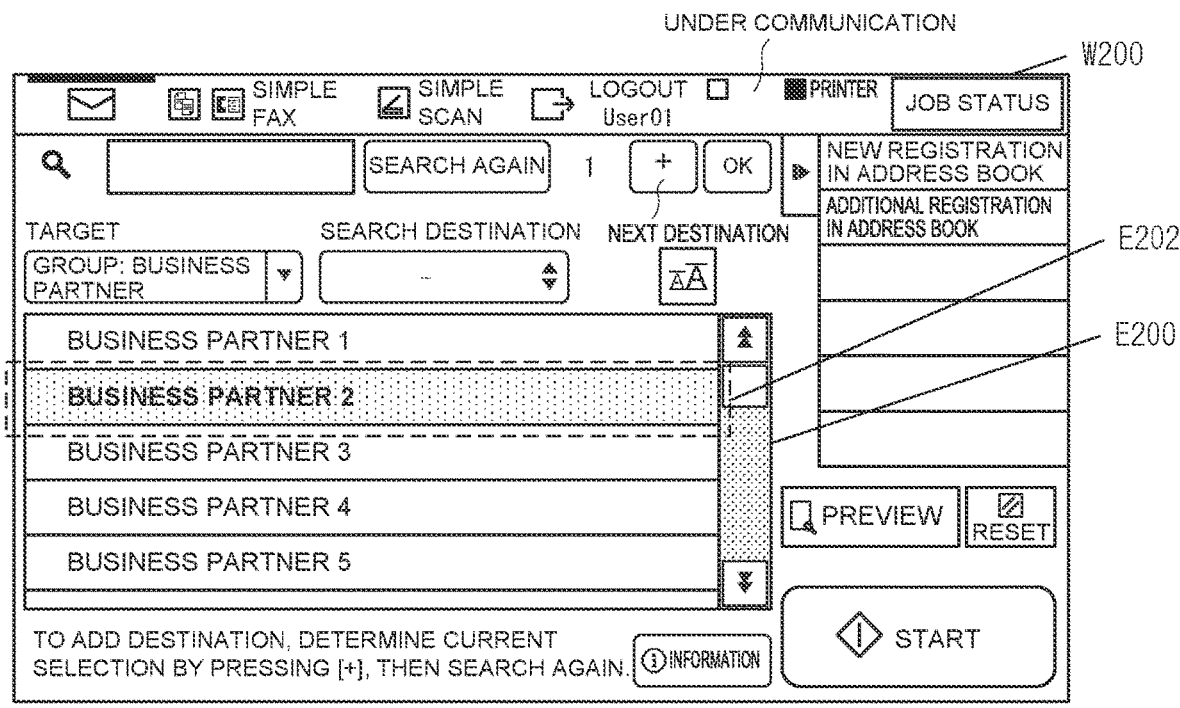
FIGS. 17A and 17B are diagrams illustrating an operation example according to the second embodiment.
Figure 17B:
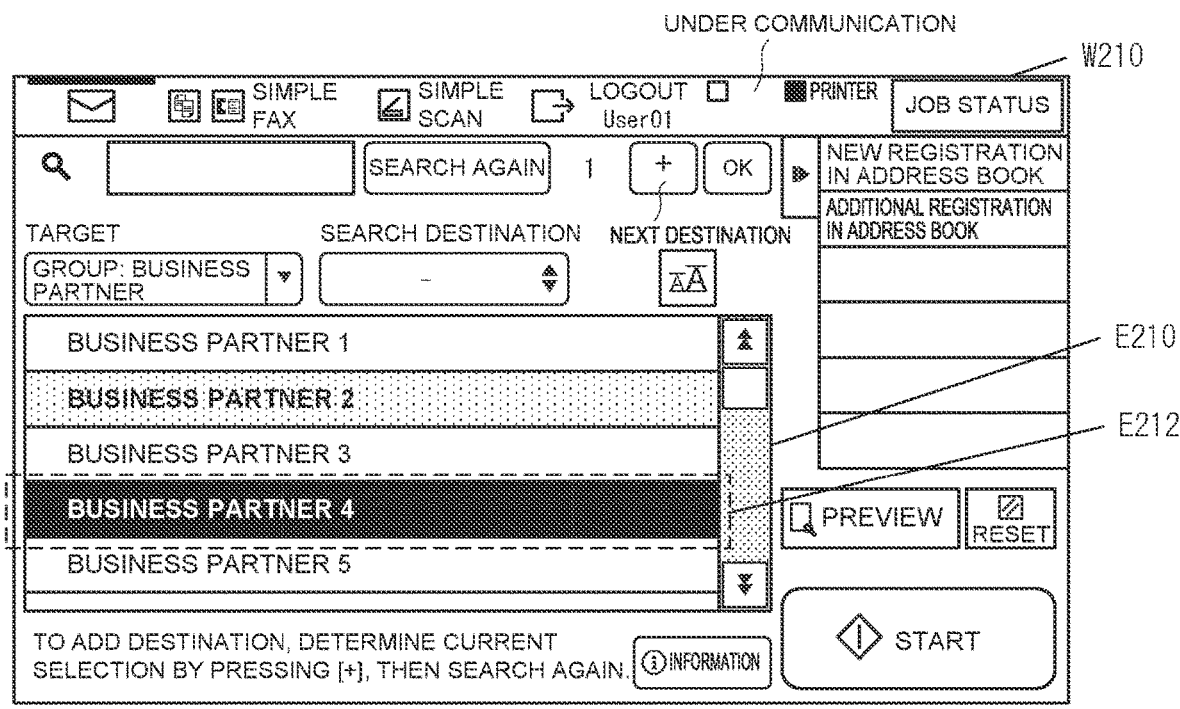
Figure 18:
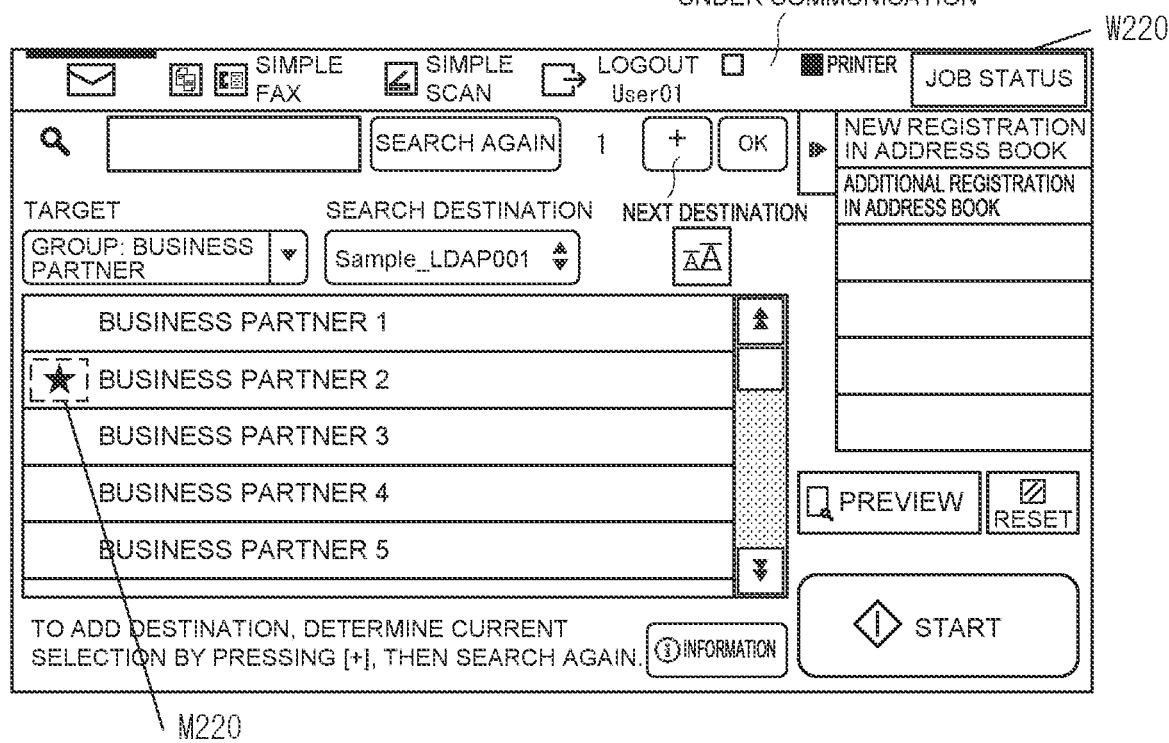
FIG. 18 is a diagram illustrating an operation example according to the second embodiment.

Next, an operation example according to the present embodiment is described with reference to FIGS. 17A to 18. FIG. 17A is an example illustrating a display screen W200 to be displayed on a displayer 240, when address book data transfer from a terminal device 10 to an image processing apparatus 20 is completed. As illustrated in FIG. 17A, the display screen W200 includes a list E200 for selecting address book data received from the terminal device 10.

Herein, when address book data associated with a destination previously selected by the user is present in address book data displayed in the list E200, the address book data are identified and displayed. For example, as illustrated in an area E202, a background color different from that of another item may be displayed, or characters indicating a name may be displayed in bold letters, as identification display.

The user can select address book data from the list E200. FIG. 17B is an example illustrating a display screen W210 to be displayed on the displayer 240, when address book data are selected by the user. As illustrated by an item E212 in FIG. 17B, address book data selected by the user are displayed in a highlighted manner. Note that, as illustrated in FIG. 17B, display patterns of address book data previously selected by the user, and address book data selected by the user this time may be different from each other. This makes it possible for the user to distinguish between previously selected address book data, and address book data selected this time.

Note that, the identification display method may be a method other than the method illustrated in FIGS. 17A and 17B. For example, as illustrated in a destination selection screen W220 in FIG. 18, a mark M220 may be displayed on address book data previously selected by the user.

In the image processing apparatus according to the present embodiment, by displaying address book data, based on selected destination information, a destination that has been selected as a transmission destination of image data can be displayed in such a way that the user can easily select the destination as compared with another destination. Thus, the image processing apparatus according to the present embodiment can display a highly convenient destination selection screen.

3. Third Embodiment

Next, a third embodiment is described. The third embodiment is an embodiment in which an image processing apparatus reorders and displays destinations received from a terminal device. The present embodiment is an embodiment in which FIG. 10 in the first embodiment is replaced with FIG. 19. Note that, same processing is indicated with a same reference sign, and description thereof is omitted.

Figure 19:
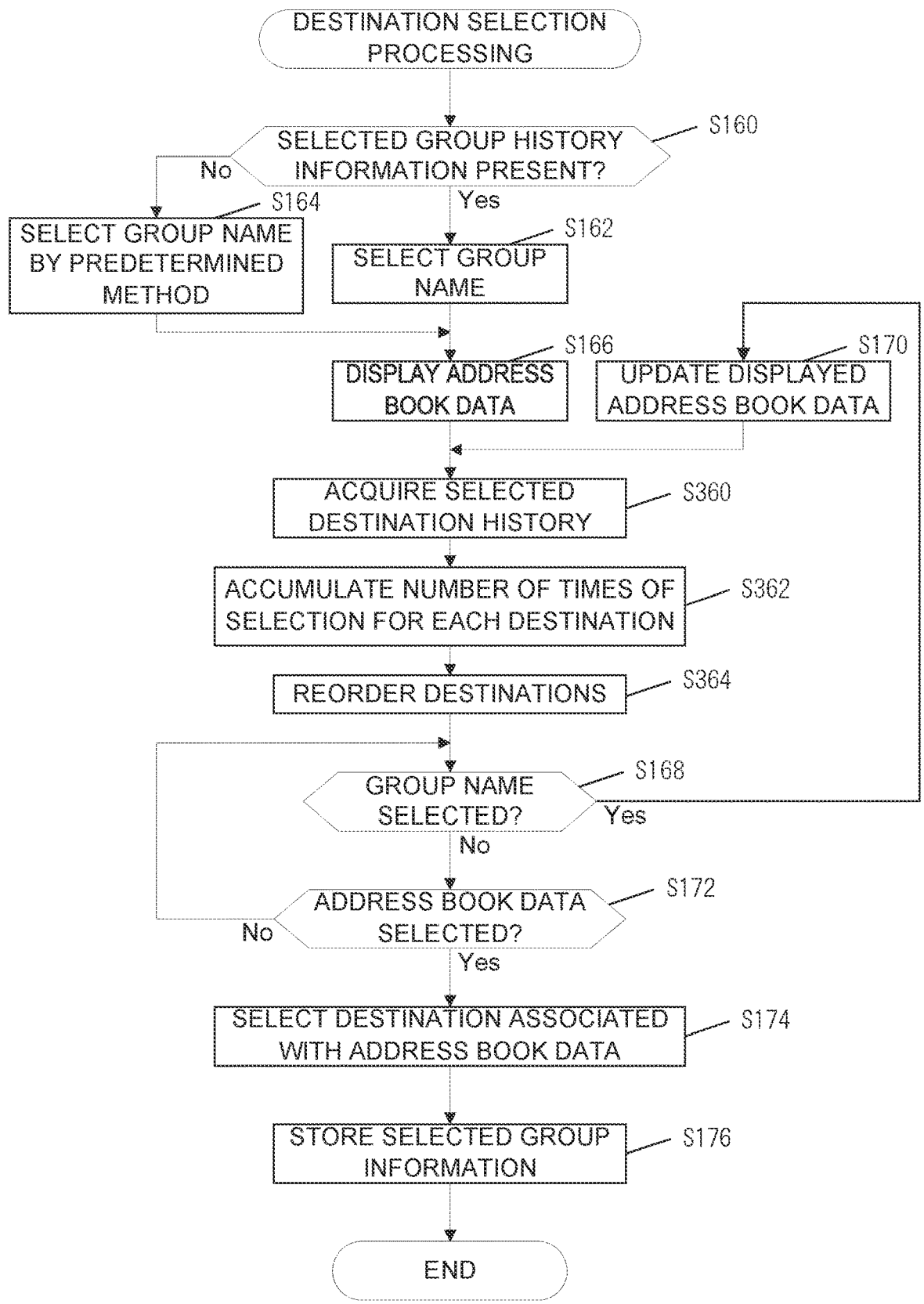
FIG. 19 is a flowchart illustrating a flow of destination selection processing according to a third embodiment.

A flow of destination selection processing according to the present embodiment is described with reference to FIG. 19. After displaying address book data in Step S166, or updating address book data displayed in Step S170, a controller 200 acquires a selected destination history (Step S360). Processing in Step S360 is processing similar to that in Step S260 in FIG. 16.

Then, the controller 200 compiles the number of times of selection by the user for each destination (Step S362). Next, the controller 200 reorders address book data displayed on a destination selection screen, based on a result of compiling in Step S362 (S364). For example, the controller 200 reorders address book data displayed in Step S166 or Step S170 in such a way that address book data including a destination that has been selected by the user a large number of times are displayed at a higher rank in a list. Thus, the controller 200 can display address book data including a destination that is selected frequently by the user at a higher rank in a list by a specified number of display columns.

Figure 20:
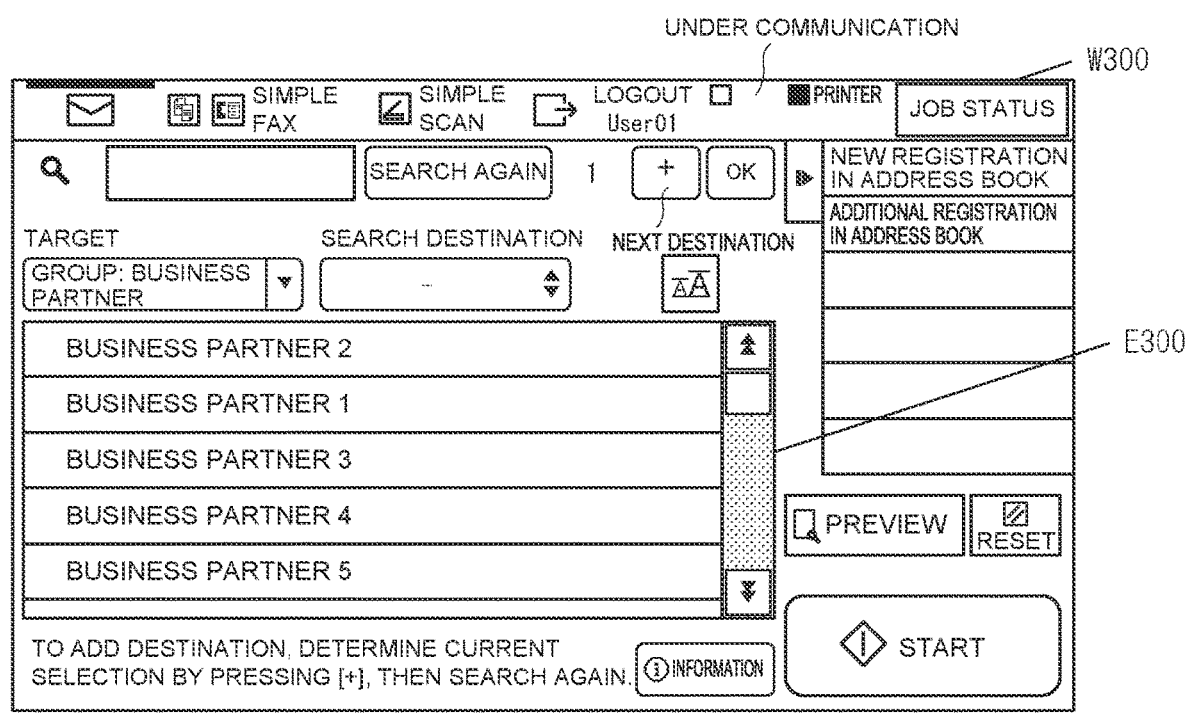
FIG. 20 is a diagram illustrating an operation example according to the third embodiment.

Next, an operation example according to the present embodiment is described with reference to FIG. 20. FIG. 20 is an example illustrating a display screen W300 to be displayed on a displayer 240, when address book data transfer from a terminal device 10 to an image processing apparatus 20 is completed. As illustrated in FIG. 20, the display screen W300 includes a list E300 for selecting address book data received from the terminal device 10.

Herein, address book data to be displayed in the list E300 are displayed at a higher rank, as the address book data include destination information having a large number of times of selection by the user. In other words, address book data to be displayed at a higher rank in the list E300 are address book data having a large number of times of selection by the user.

In this way, in the image processing apparatus according to the present embodiment, address book data are reordered based on transmission history information. This makes it possible for the user to easily select address book data having a high frequency of selection, without an operation such as scrolling.

4. Modification Example

The present invention is not limited to the above-described embodiments, and various changes are available. Specifically, embodiments to be acquired by appropriately combining modified technical means within a range that does not depart from the gist of the present invention are also included in the technical scope of the present invention.

Although some of the above-described embodiments are described separately for convenience of explanation, it is needless to say that combining and implementing the embodiments within a technically allowable range is also possible. For example, the second embodiment and the third embodiment may be combined. In this case, address book data to be displayed on a destination selection screen are displayed at a higher rank, as the number of times of selection increases, and address book data that are selected frequently are identified and displayed.

In addition, a program operating in each device in the embodiments is a program (a program causing a computer to function) that controls a CPU or the like in such a way as to achieve functions of the above-described embodiments. Information to be handled by these devices is temporarily stored in a temporary storage device (e.g., a RAM) at the time of processing, and thereafter, is stored in a storage device such as various read only memories (ROMs) and HDDs, and is read and corrected/written by the CPU as necessary.

Herein, a recording medium for storing the program may be any of a semiconductor medium (e.g., a ROM, a non-volatile memory card, and the like), an optical recording medium/magneto-optical recording medium (e.g., a digital versatile disc (DVD), a magneto optical disc (MO), a mini disc (MD), a compact disc (CD), a Blu-ray Disc (registered trademark) (BD), and the like), a magnetic recording medium (e.g., a magnetic tape, a flexible disk, and the like), and the like. In addition, not only functions of the above-described embodiments are achieved by executing a loaded program, but also functions of the present invention may be achieved by processing the program jointly with an operating system, other application program, or the like, based on an instruction of the program.

Further, in a case of distributing the program in the market, the program can be stored in a portable recording medium and distributed, or can be transferred to a server computer connected via a network such as the Internet. In this case, it is needless to say that a storage device of the server computer is also included in the present invention.

What is claimed is:

1. An image processing apparatus comprising:
   a processor;
   a displayer;
   a storage; and
   a communicator, wherein
   the processor performs one or more processes to:
   receive address book data from a terminal device by communicating with the terminal device via the communicator, the address book data being stored in the terminal device in such a way that information indicating a user. information indicating a destination, and group information are associated with each other;
   select, in a case where a selected group history indicating that the group information is selected in the past is stored in the storage, one piece of group information from among the group information included in the address book data based on the selected group history; and
   display, on the displayer, including the information indicating the user associated with the one piece of group information.

2. The image processing apparatus according to claim 1, wherein
   the group information is a group name.

3. The image processing apparatus according to claim 1, wherein
   the screen displayer processor further performs the one or more processes to:

display screen for selecting the group information included in the address book data on the displayer, and control the one piece of group information to be in a selected state.

4. The image processing apparatus according to claim 1, wherein the processor further performs the one or more processes to:

store a selected destination history indicating the information indicating the destination selected in the past, and display the information indicating the user on the displayer based on the selected destination history.

5. The image processing apparatus according to claim 4, wherein the processor further performs the one or more processes to:

identify and display the information indicating the user selected in the past from among the information indicating the user associated with the information indicating the destination, based on the selected destination history.

6. The image processing apparatus according to claim 4, wherein the processor further performs the one or more processes to:

reorder and display the information indicating the user according to the number of times of selection of the information indicating the destination selected in the past, based on the selected destination history.

7. A control method comprising:

receiving address book data from a terminal device by communicating with the terminal device, the address book data being stored in the terminal device in such a way that information indicating a user, information indicating a destination, and group information are associated with each other;

in a case where a selected group history indicating that the group information is selected in the past is stored in a storage, selecting one piece of group information from among the group information included in the address book data, based on the selected group history; and displaying, on a displayer, the information indicating the user associated with the one piece of group information.

\* \* \* \* \*